United States Patent
Gagne-Keats et al.

(10) Patent No.: US 11,750,388 B2
(45) Date of Patent: Sep. 5, 2023

(54) LINKING DIGITAL AND PHYSICAL NON-FUNGIBLE ITEMS

(71) Applicant: OSOM Products, Inc., Cupertino, CA (US)

(72) Inventors: Jason Sean Gagne-Keats, Cupertino, CA (US); Gary Anderson, San Mateo, CA (US); Wolfgang Wesley Muller, San Francisco, CA (US); Jean-Baptiste Charles Theou, Sene (FR)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/158,891

(22) Filed: Jan. 24, 2023

(65) Prior Publication Data
US 2023/0239152 A1    Jul. 27, 2023

Related U.S. Application Data

(60) Provisional application No. 63/267,080, filed on Jan. 24, 2022.

(51) Int. Cl.
| | |
|---|---|
| *H04L 29/06* | (2006.01) |
| *H04L 9/32* | (2006.01) |
| *H04L 9/08* | (2006.01) |
| *H04W 12/71* | (2021.01) |

(52) U.S. Cl.
CPC .......... *H04L 9/3213* (2013.01); *H04L 9/0825* (2013.01); *H04L 9/3247* (2013.01); *H04W 12/71* (2021.01); *H04L 2209/60* (2013.01)

(58) Field of Classification Search
CPC ... H04L 9/3213; H04L 9/0825; H04L 9/3247; H04L 2209/60; H04W 12/71
See application file for complete search history.

(56) References Cited

U.S. PATENT DOCUMENTS

| | | | |
|---|---|---|---|
| 11,367,060 B1 * | 6/2022 | Barbashin | G06Q 30/0201 |
| 11,477,027 B1 * | 10/2022 | Palatov | H04L 63/0823 |
| 2007/0050622 A1 * | 3/2007 | Rager | G06F 21/445 |
| | | | 713/168 |
| 2013/0227286 A1 * | 8/2013 | Brisson | H04L 63/062 |
| | | | 713/168 |
| 2013/0290119 A1 * | 10/2013 | Howe | G06Q 20/4015 |
| | | | 705/16 |
| 2020/0242105 A1 * | 7/2020 | Rich | H04L 67/1097 |
| 2022/0279351 A1 * | 9/2022 | Blasi | H04W 12/084 |
| 2022/0343325 A1 * | 10/2022 | Hu | H04L 9/3213 |

(Continued)

FOREIGN PATENT DOCUMENTS

| | | | | |
|---|---|---|---|---|
| IL | 282825 A | * | 6/2021 | |
| WO | WO-2014191952 A1 | * | 12/2014 | ......... G06F 12/1408 |
| WO | WO-2021044211 A | * | 3/2021 | ........... H04L 9/0643 |

*Primary Examiner* — Sher A Khan
(74) *Attorney, Agent, or Firm* — Perkins Coie LLP; Alberto Araiza; Lena Petrovic

(57) ABSTRACT

The technology relates to a technique for representing a unique physical asset such as a smartphone with a unique (singular) digital asset such as a non-fungible token (NFT). The NFT and related metadata can be stored on a blockchain to verify ownership of the digital asset. In one example, the NFT is produced based on a unique identifier (IMEI) for the smartphone. Other examples of physical assets with unique identifiers include automobiles, real property, etc.

23 Claims, 4 Drawing Sheets

(56) References Cited

U.S. PATENT DOCUMENTS

| | | | |
|---|---|---|---|
| 2022/0351187 A1* | 11/2022 | Kim | G06Q 20/3276 |
| 2022/0383295 A1* | 12/2022 | Cox | G06Q 20/38215 |
| 2023/0034169 A1* | 2/2023 | Ferenczi | H04L 9/3271 |
| 2023/0063408 A1* | 3/2023 | Young | G06Q 20/38215 |
| 2023/0075884 A1* | 3/2023 | Jakobsson | G06Q 20/3678 |
| 2023/0088936 A1* | 3/2023 | Chalkley | G06Q 10/00 |
| | | | 705/26.81 |

* cited by examiner

LINKING DIGITAL AND PHYSICAL NON-FUNGIBLE ITEMS

CROSS-REFERENCE TO RELATED APPLICATIONS

This application claims the benefit of U.S. Provisional Application No. 63/267,080, filed Jan. 24, 2022. The aforementioned application is incorporated herein by reference in its entirety for all purposes.

TECHNICAL FIELD

The disclosed teachings generally relate to linking digital and physical non-fungible assets.

BACKGROUND

A non-fungible token (NFT) is a non-interchangeable unit of data stored on a blockchain, a form of digital ledger. Types of NFT data units include digital files such as photos, videos, and audio. Because each token is uniquely identifiable, NFTs differ from blockchain cryptocurrencies, such as Bitcoin. NFT ledgers can provide a public certificate of authenticity or proof of ownership.

BRIEF DESCRIPTION

Detailed descriptions of implementations of the present invention will be described and explained through the use of the accompanying drawings.

Figure 1:
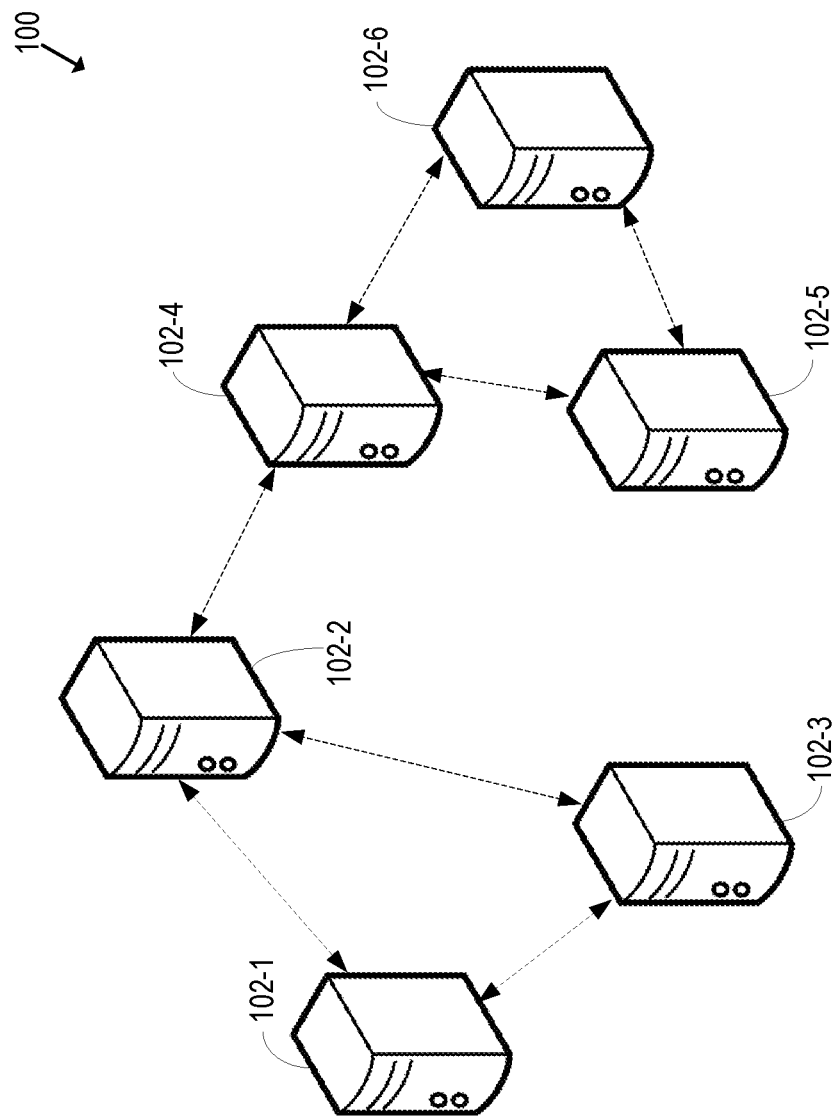
FIG. 1 is a block diagram that illustrates a blockchain including a network of peer nodes that can store non-fungible tokens (NFTs).

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a technique for representing a unique physical item (e.g., smartphone) with a unique digital item such as a cryptographic token (e.g., a non-fungible token (NFT)). The cryptographic token may be generated using a unique identifier corresponding to the unique physical item, e.g., an IMEI (International Mobile Equipment Identity) number. By assigning the cryptographic token to the owner of the physical item, the cryptographic token symbolizes ownership. The cryptographic token may perform functions such as an authentication factor for accessing the physical item. The cryptographic token may also indicate descriptive data regarding the physical item, e.g., the make and model a phone, its usage of cellular data, and a backup of data on the phone.

In one example, the NFT can be stored on a blockchain to prove ownership of the smartphone prior to and after delivery to a person (e.g., an owner). In addition or alternatively, the NFT can be stored on the smartphone as a form of cold storage (such that the NFT gets transferred along with the device). The NFT can enable certain utilities of the smartphone depending on who and when the NFT is owned. For example, the linkage can be used as an authentication factor after the smartphone has been delivered to the owner.

The IMEI number is a unique identification that all mobile phones and smartphones have. It is normally 15 digits long. The IMEI number can be found on a sticker on the back of a phone, under the battery pack, or on the box the phone came in. The IMEI number can be thought of as a phone's fingerprint. As such, phone carriers and manufacturers can share IMEI numbers to enable tracking smartphones that may be stolen or compromised. An IMEI number is not the serial number listed on a device. Manufacturers only use serial numbers internally, whereas IMEI numbers are standard across the industry. IMEI is one example of a unique identifier but various unique identifier number can be linked to an NFT. A serial number can be used for the NFT; however, IMEI numbers additional enable tracking because carriers and manufacturers can share IMEI numbers.

As used herein, an NFT is a unit of data that can be stored on a digital ledger (e.g., a blockchain), and the NFT can be sold and traded. The NFT can be associated with a particular digital asset (such as a file) and a license to use the asset for a specified purpose. An NFT (and, if applicable, the associated license to an underlying asset) can be traded and sold on secondary digital markets. Hence, NFT trading can result in an exchange of ownership over an underlying asset.

NFTs function like cryptographic tokens, but, unlike cryptocurrencies such as Bitcoin or Ethereum, NFTs are not mutually interchangeable, hence not fungible. While all bitcoins are equal, each NFT may represent a different underlying asset and thus may have a different value. NFTs are created when blockchains string records of cryptographic hash (a set of characters identifying a set of data) onto records therefore creating a chain of identifiable data blocks. This cryptographic transaction process ensures the authentication of each digital file by providing a digital signature that is used to track NFT ownership. NFTs may be assigned to cryptographic addresses, and such addresses are able to use records on the blockchain to demonstrate their ownership of NFTs.

The NFT can represent the phone decoupled from an owner. Whoever owns the NFT will have to register the NFT on a manufacturer or distributor website to receive the phone. A benefit of this method is that a sale is complete when the NFT is sold (e.g., not refundable). That is, delivery of goods is complete without an escrow. The sale of the NFT can enable utilities and/or be associated with promotional campaigns. For example, every 100th NFT sold by a manufacturer can trigger a redeemable marketing branding event (e.g., gift). The NFT can be associated with time snapshots that are thresholds for enabling utilities before or after the snapshots or allow for redeeming goods relative to the snapshots.

A cryptographic token (e.g., an NFT) may be created in association with a physical item, e.g., a phone. The cryptographic token can be assigned to a cryptographic address of a cryptography-based storage application (e.g., digital wallet), and cryptography-based storage application can be used to authenticate login requests for the physical item via blockchain operations. Therefore, control of the cryptographic token may indicate and/or enable control of the physical item. Transferring control of the physical item may be performed in a cryptographically secure manner.

The blockchain can store NFTs and associated transactions in records, copies of which are distributed and maintained among nodes of a computer network. The entries are stored in blocks of the distributed ledger that are cryptographically related. A public blockchain is a common example of a distributed ledger that can record data or transactions between parties in a verifiable and permanent way. Specifically, a blockchain system has a decentralized, distributed database where a ledger is maintained by peer nodes. Hence, an intermediary is not required to maintain a blockchain. The data are typically authenticated with cryptographic hashing and mining techniques.

The blockchain is analogous to a distributed database on a distributed computing system that maintains a continuously growing list of ordered records called blocks. A block of a blockchain includes records of transaction(s) or other recorded data (e.g., condition data). Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording NFTs, events, conditions, other records management activities, identity management, transaction processing, and proving data provenance. Examples of decentralized systems that implement blockchains include Bitcoin, Ethereum, and Solana. These types of systems provide a pragmatic solution for arriving at a consensus in the face of trust and timing problems typically encountered in distributed networks.

FIG. 1 illustrates a network 100 of interconnected peer nodes 102-1 through 102-6 (also referred to collectively as peer nodes 102 and individually as peer node 102). The peer nodes 102 can be distributed across various geographic locations including regions all over the world. The network 100 can include a combination of private, public, wired, or wireless portions. Data communicated over the network 100 can be encrypted or unencrypted at various locations or portions of the network 100. Each peer node 102 can include combinations of hardware and/or software to process data, perform functions, communicate over the network 100, and the like.

The peer nodes 102 can include computing devices such as servers, desktop or laptop computers, handheld mobile devices, and other electronic device. Any component of the network 100 can include a processor, memory or storage, a network transceiver, a display, operating system, and application software (e.g., for providing a user interface), and the like. Other components, hardware, and/or software included in the network 100 that are known to persons skilled in the art are not shown or discussed herein for the sake of brevity.

The network 100 can implement a blockchain that allows for the secure management of a shared ledger, where NFTs are verified and stored on the network 100 without a governing central authority. Blockchains can be implemented in different configurations, ranging from public, open-source networks, to private blockchains that require explicit permission to read or write transactions. Central to a blockchain are cryptographic hash functions that secure the network 100, in addition to enabling transactions, to protect a blockchain's integrity and anonymity.

The network 100 can utilize cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. Moreover, the keys could be expressed in various formats, including hexadecimal format.

As such, the blockchain storing the NFT can be used as proof of ownership of a physical asset and as a factor for authentication to perform transactions. In one example, cross-chain compatibility is enabled to transfer NFT-related data on different blockchains. For example, a personal digital wallet can hold the NFT, which does not need to be tied to a specific ecosystem (e.g., Solana). Instead, the disclosed technology is blockchain agnostic such that NFT-related data (e.g., a smart contract associated with an NFT transaction) can be transferred across different blockchains.

Figure 2:
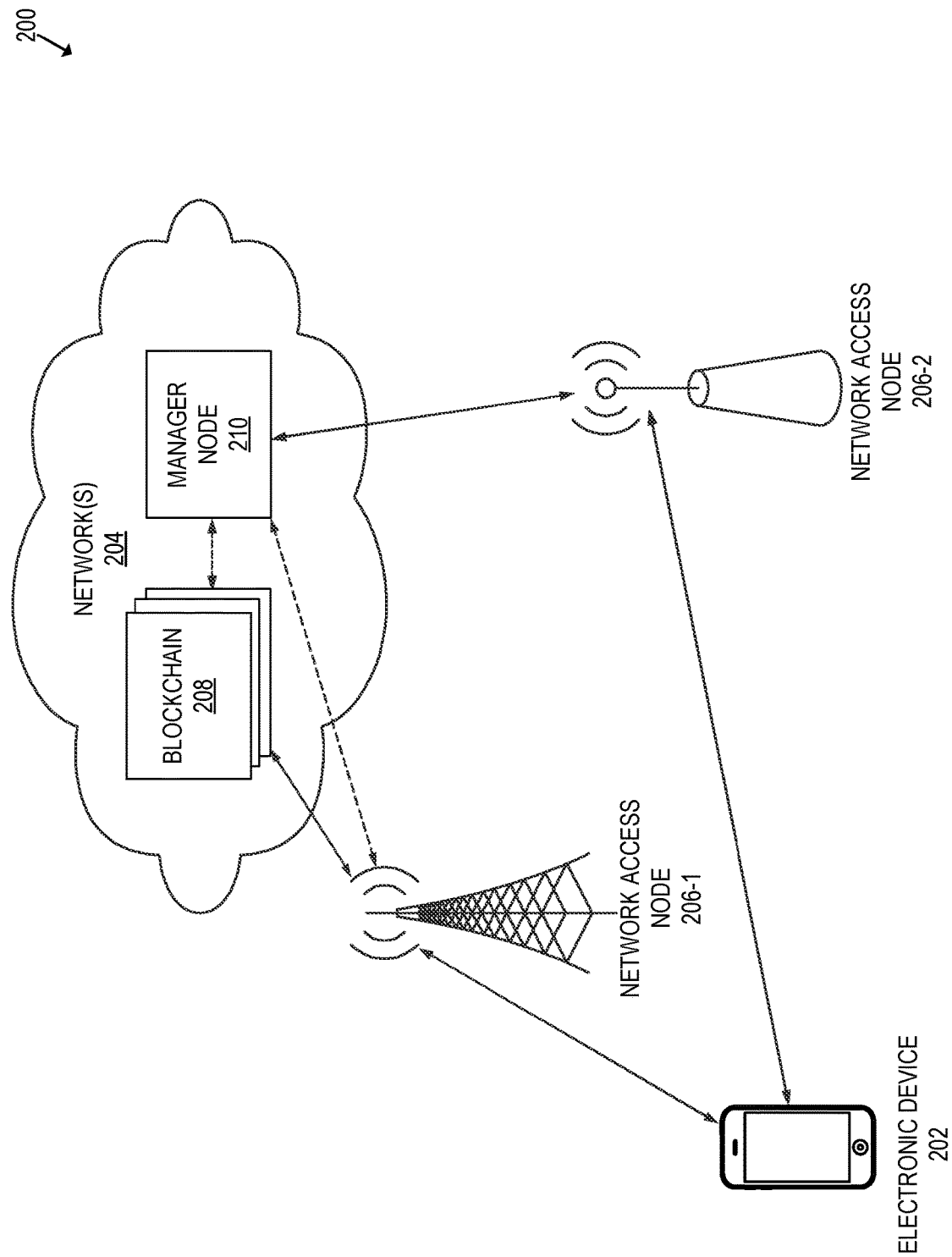
FIG. 2 is a block diagram that illustrates a system that can manage NFTs linked to non-fungible devices.

FIG. 2 is a block diagram that illustrates a system that can manage NFTs linked to non-fungible electronic devices. The system 200 includes an electronic device 202 that is communicatively coupled to one or more networks 204 via network access nodes 206-1 and 206-2 (referred to collectively as network access nodes 206).

The electronic device 202 can be any type of electronic device that can communicate wirelessly with a network node and/or with another electronic device in a cellular, computer, and/or mobile communications system. Examples of the electronic device 202 include smartphones, tablet computers, wireless devices capable of machine-to-machine (M2M) communication, wearable electronic devices, Internet of Things devices (IoT devices), and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustic, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

The system 200 depicts different types of wireless access nodes 206 to illustrate that the electronic device 202 can access different types of networks through different types of network access nodes. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The system 200 includes a blockchain 208 that stores non-fungible data (e.g., NFTs) linked to the electronic device 202 and communicated to the blockchain 208 via the network access nodes 206. The blockchain 208 is distributed over a combination of network nodes (e.g., peer nodes 102) that store NFTs and related data across other network nodes of a peer-to-peer network. The network nodes of the blockchain 208 can each replicate and store an identical copy of the condition data and update independently. Although shown in the network(s) 204, the blockchain 208 can be located anywhere to maintain a tamper-proof copy of NFT-related data.

The system 200 includes a manager node 210 that can mediate the flow of NFTs and related data on the blockchain 208 and linked to the electronic device 202. In some embodiments, the manager node 210 can include any number of server computers communicatively coupled to the electronic device 202 via the network access nodes 206. The manager node 210 can include combinations of hardware and/or software to process condition data, perform functions, communicate over the network(s) 204, etc. For example, server computers of the manager node 210 can include a processor, memory or storage, a transceiver, a display, operating system and application software, and the like. Other components, hardware, and/or software included in the system 200 that are well known to persons skilled in the art are not shown or discussed herein for brevity. Moreover, although shown as being included in the network(s) 204, the manager node 210 can be located anywhere in the system 200 to implement the disclosed technology.

The manager node 210 can track a current owner of the electronic device 202 based on its linked NFT. The manager node 210 can also control which types of utilities are available for the electronic device 202 based on ownership of the associated NFT. In some embodiments, NFT-related data could have values that depend on the age of the NFT and owner of the electronic device 202.

Figure 3:
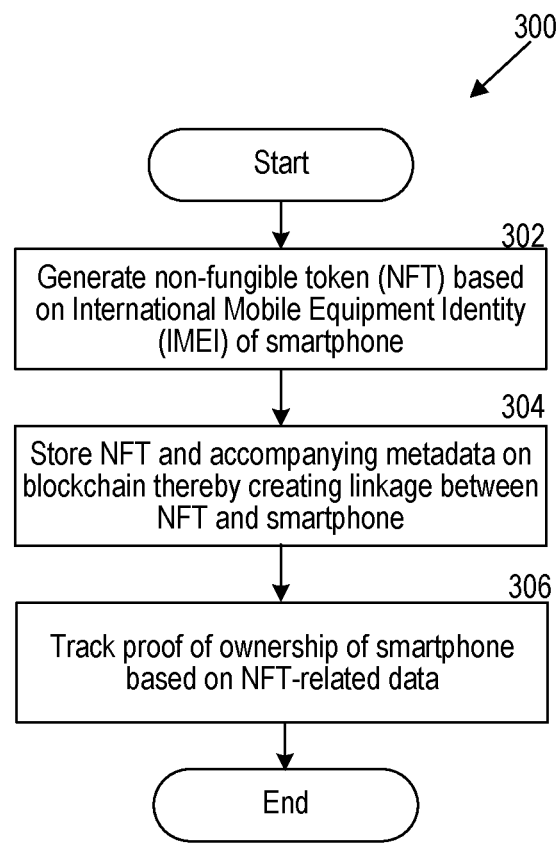
FIG. 3 is a flowchart that illustrates a method for linking digital and physical non-fungible assets.

FIG. 3 is a flowchart that illustrates a method 300 for linking digital and physical non-fungible items. At 302, a system generates an NFT that represents a unique identifier (e.g., IMEI) of a physical asset (e.g., smartphone). At 304, the NFT is stored on a blockchain. The NFT can be stored on the blockchain as public evidence of ownership of the phone (or stored on the smartphone itself). In one example, accompanying data (e.g., metadata) can be stored along with the NFT on the blockchain. The NFT-related data (NFT and metadata) enables tracking of the physical asset by a carrier and/or manufacturer. At 306, the system enables/disables tracking or monitoring activity associated with the NFT device over time.

In one example, a system obtains or generates a unique identifier (e.g., IMEI) for a physical item (e.g., smartphone). The system receives a confirmation request from a first cryptography-based storage application comprising a confirmation number. The system compares the confirmation number to the unique identifier. The system generates a first cryptographic token based on the unique identifier. The system can then commit the first cryptographic token to the blockchain and assign the first cryptographic token to the first cryptography-based storage application.

Physical items may be assigned unique identifying numbers (e.g., IMEI for smartphones). Such identifying numbers can be used to represent physical items and could be used to indicate ownership. To protect the privacy of such identifying numbers as well as metadata associated with physical items such as smartphones, cryptographic tokens may be used to better protect confidentiality and enhance security of data associated with smartphones.

For example, a cryptography-based storage application may be linked with ownership of a smartphone when the system receives a confirmation number from the cryptography-based storage application. In some embodiments, the confirmation number can be the IMEI for the phone. In other embodiments, the confirmation number may be a hash or other mathematical transformation of the IMEI for the phone. The system can compare the confirmation number against the unique identifier. In some embodiments, e.g., when the confirmation number is a hash of an IMEI, the system can decrypt the confirmation number to extract the unique identifier (IMEI). Thus, the system can confirm that the cryptography-based storage application is owned by a user also owning the phone associated with the NEI.

The system can generate a first cryptographic token (the NFT) based on the unique identifier. The NFT can be associated with a first entry in a metadata database. The NFT may indicate its ownership as the address of the cryptography-based storage application, and therefore represent the rights to a smartphone and/or associated services and utilities. For example, before an owner can take possession of the device, the NFT can act as a tradable asset (despite the physical asset not being available) to grant access to a resource, or the resource can be made available the day the device is delivered to the owner of the NFT. In some embodiments, an NFT may be created and given to a user's cryptography-based storage application before the user receives the smartphone. After creating the NFT, the system may commit it to the blockchain and assign it to a cryptography-based storage application. The system may do so by modifying an "owner address" field of the NFT to be the blockchain address of the cryptography-based storage application.

The linkage between digital and physical non-fungible assets can, in some embodiments, act as an authentication factor. For example, the cryptography-based storage application may be located on the smartphone represented by the NFT. A login attempt for the smartphone can involve receiving a login request for accessing the physical item, containing an address associated with the cryptography-based storage application, and a cryptographic signature generated using a private key of the first cryptography-based storage application. The blockchain may use the private key to verify the validity of the cryptographic signature and grant the login request. In this way, the NFT not only symbolizes the right to access the smartphone, it can constitute actual control over the smartphone. By doing so, login attempts at the smartphone gain cryptographic security and confidentiality.

The linkage between digital and physical non-fungible assets can optionally act as an authentication factor. For example, the NFT can act as one of multiple authentication factors used for conducting a transaction to purchase goods or services. In one example, the NFT acts as an authentication mechanism that enables the owner to sell the NFT in a secondary market. As such, the NFT can come with an accompanying utility, which can vary. The NFT may be transferred from a first cryptographic address of a first cryptography-based storage application to a second cryptographic address of a second cryptography-based storage application. For example, the system may receive, from the first cryptography-based storage application, a request for transference of the first cryptographic token. The request for transference indicates a destination cryptographic address corresponding to a second cryptography-based storage application. The system may then use a blockchain operation to verify that the first cryptographic token is, in fact, still assigned to the first cryptography-based storage application. After confirming that the first cryptographic token is assigned to the first cryptography-based storage application and that the request for transference is signed with a valid signature of the first cryptography-based storage application, the system may assign the first cryptographic token to the second cryptography-based storage application at the destination cryptographic address.

The NFT comes with an accompanying utility, which may be dynamically adjusted through the metadata database. Further, the NFT can increase in value, and be used to buy a second device (the NFT is then tied to the second device). In addition to the login authentication factor mentioned above, the NFT may perform additional functions and services related to a smartphone. For example, the metadata database may list a set of utilities currently applied to the smartphone. Bandwidth allotment from mobile data service providers, along with an amount and/or an expiration date may be stored in the metadata database. Similarly, a backup of the user's personal data may be stored in the metadata database, and may be exported with a request. The NFT, because it records the IMEI or other identifier of the smartphone, may serve as proof of eligibility for certain events and/or promotions that the manufacturer of the smartphone may hold for its customers which are applicable specifically to certain phones. At regular time intervals, the system may request profiles of data from a smartphone. The profiles of data describe utilities and services currently applied to the smartphone. The profiles of data may then be stored in the metadata database. In some embodiments, the system may aggregate and correct such profiles of data. For example, a warranty on the smartphone which has expired may be removed from the metadata database. The profiles of data may include additional information which are not descriptions of utilities and services for the smartphone, but which are still stored in the metadata database. Such additional information may include a real-time GPS location of the smartphone, a real-time usage of cellular data, and personal information about the user of the smartphone (e.g., emergency contact information).

In some embodiments, a first smartphone may be eligible for replacement by a second smartphone. Data on and/or describing the first smartphone included in the metadata database may be transferred to a cryptographic token (e.g., NFT) associated with the second smartphone. The system may receive a request for a replacement of the first smartphone from the first cryptography-based storage application. The system may use a blockchain operation to verify that the first cryptographic token is still assigned to the first cryptography-based storage application and determine to issue a second smartphone and a corresponding NFT. The system may obtain a second unique identifier for a second physical item and generate a second cryptographic token based on the unique identifier. The second cryptographic token may be a non-fungible token, and may be associated with the first entry in a metadata database. Thus, the second cryptographic token may inherit data associated with the first cryptographic token, such that the second smartphone may replace the first smartphone with greater expedience. The system may commit the second cryptographic token to the blockchain and assign the second cryptographic token to the first cryptography-based storage application. Thus the user of the first smartphone may retrieve their data and continue using the utilities and services associated with the first NFT.

In some embodiments, a cryptographic token may be destroyed or revoked from a first cryptography-based storage application. To use the above scenario, the NFT associated with a first smartphone is replaced by a second NFT. The system may therefore first determine to revoke the first NFT. Using a cryptographic operation, the system may assign the first cryptographic token to a null address. Thus, the first user is deprived of their control of the first NFT. In some embodiments, the system may remove the first entry (representing the first NFT) from the metadata database.

Although examples described herein refer to linking a smartphone or other non-fungible electronic device to an NFT, the disclosed technology is not so limited. Instead, the technology encompasses linking digital non-fungible assets as proof of ownership over any physical object that is uniquely identifiable, particularly among other physical objects of the same kind or type and using a unique identifier. Examples include a vehicle identification number (VIN) of an automobile or a parcel number or physical address for real property. As such, the NFT or other unique digital asset can represent ownership over the unique physical asset.

The technology also relates to a technique for selling the rights to a unique physical object based on ownership over a digital object that is intrinsically linked to the physical object. The NFT acts as a proof or evidence of the purchase (e.g., receipt). The NFT can be timestamped for the date of purchase or for a date that triggers certain rights over the physical object. For example, an NFT for a particular phone can be associated with a future date such that the owner of the NFT at that date will be granted rights to the physical asset via the NFT. As such, the NFT can be stored on a blockchain with accompanying metadata that is used to, for example, track services, historical data, or other status data for the physical asset.

Computer System

Figure 4:
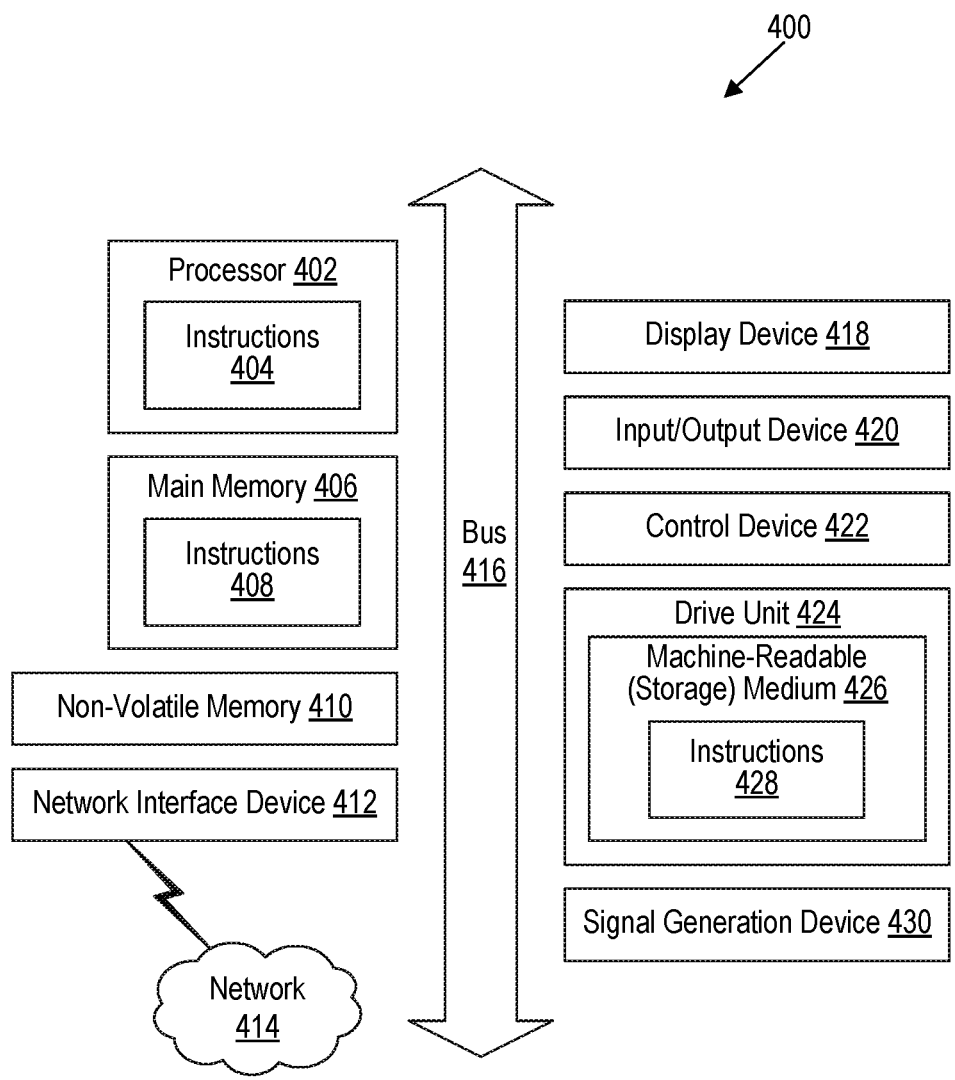
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A system for linking non-fungible tokens and smartphones, the system comprising:
   a processor; and
   a memory storing instructions that, when executed by the processor, cause the system to:
   obtain an International Mobile Equipment Identity (IMEI) number of a smartphone;
   receive a confirmation request from a first cryptography-based storage application of a first user,
      wherein the confirmation request comprises a confirmation number;
   compare the confirmation number to the IMEI number to determine that the first user is in possession of the smartphone;
   generate a first cryptographic token based on the IMEI number,
      wherein the first cryptographic token is a non-fungible token,
      wherein the first cryptographic token is associated with a first entry in a metadata database;
   transmit, to a blockchain node of a blockchain, a blockchain operation request to commit the first cryptographic token to the blockchain,
      wherein the blockchain operation request assigns the first cryptographic token to the first cryptography-based storage application;
   receive a login request for accessing the smartphone,
      wherein the login request includes an address associated with the first cryptography-based storage application and a cryptographic signature generated using a private key of the first cryptography-based storage application;
   determine, using the cryptographic signature, that the first cryptography-based storage application controls the first cryptographic token; and
   grant access to the smartphone responsive to the login request.

2. The system of claim 1, wherein the first cryptography-based storage application is stored on the smartphone.

3. The system of claim 1, wherein the first cryptographic token authenticates login requests for the metadata database.

4. The system of claim 1, wherein the metadata database communicates with the smartphone, the memory storing instructions further causing the system to:
   at regular intervals of time, request a profile of data on the smartphone, wherein the profile of data describes a plurality of resource allocations to the smartphone; and
   store the profile of data in the metadata database.

5. The system of claim 1, wherein the metadata database stores data describing the smartphone, the data comprising:
   a location of the smartphone;
   usage by the smartphone of network resources; and
   identifying information of the first user.

6. The system of claim 1, wherein the memory storing instructions further cause the system to:
   receive a request for a replacement of the smartphone from the first cryptography-based storage application;
   using a blockchain operation, verify that the first cryptographic token is assigned to the first cryptography-based storage application;
   obtain a second IMEI number for a second smartphone;
   generate a second cryptographic token based on the second IMEI number,
      wherein the second cryptographic token is a non-fungible token, and
      wherein the second cryptographic token is associated with the first entry in the metadata database;

commit the second cryptographic token to the blockchain; and assign the second cryptographic token to the first cryptography-based storage application.

7. The system of claim 1, wherein the memory storing instructions further cause the system to:
receive, from the first cryptography-based storage application, a request for transference of the first cryptographic token,
wherein the request for transference indicates a destination cryptographic address corresponding to a second cryptography-based storage application;
using a blockchain operation, verify that the first cryptographic token is assigned to the first cryptography-based storage application; and
assign the first cryptographic token to the second cryptography-based storage application at the destination cryptographic address.

8. The system of claim 1, wherein the memory storing instructions further cause the system to:
determine to revoke the first cryptographic token;
using a cryptographic operation, assign the first cryptographic token to a null address; and
remove the first entry from the metadata database.

9. A method for linking digital and physical non-fungible items, the method comprising:
generating a unique identifier for a physical item;
receiving a confirmation request from a first cryptography-based storage application of a first user,
wherein the confirmation request comprises a confirmation number;
comparing the confirmation number against the unique identifier to determine that the first user owns the physical item;
generating a first cryptographic token based on the unique identifier,
wherein the first cryptographic token is a non-fungible token,
wherein the first cryptographic token is associated with a first entry in a metadata database;
committing the first cryptographic token to a blockchain;
assigning the first cryptographic token to the first cryptography-based storage application;
receiving a login request for accessing the physical item,
wherein the login request includes an address associated with the first cryptography-based storage application and a cryptographic signature generated using a private key of the first cryptography-based storage application;
determining, using the cryptographic signature, that the first cryptography-based storage application controls the first cryptographic token; and
granting access to the physical item responsive to the login request.

10. The method of claim 9, wherein the first cryptography-based storage application is stored on the physical item.

11. The method of claim 9, wherein the first cryptographic token authenticates login requests for the metadata database.

12. The method of claim 9, wherein the metadata database communicates with the physical item, the method further comprising:
at regular intervals of time, requesting a profile of data on the physical item, wherein the profile of data describes a plurality of resource allocations to the physical item; and
storing the profile of data in the metadata database.

13. The method of claim 9, wherein the metadata database stores data describing the physical item, the data comprising:
a location of the physical item;
usage by the physical item of network resources; and
identifying information of the first user.

14. The method of claim 9 further comprising:
receiving a request for a replacement of the physical item from the first cryptography-based storage application;
using a blockchain operation, verifying that the first cryptographic token is assigned to the first cryptography-based storage application;
obtaining a second unique identifier for a second physical item;
generating a second cryptographic token based on the unique identifier,
wherein the second cryptographic token is a non-fungible token, and
wherein the second cryptographic token is associated with the first entry in the metadata database;
committing the second cryptographic token to the blockchain; and
assigning the second cryptographic token to the first cryptography-based storage application.

15. The method of claim 9 further comprising:
receiving, from the first cryptography-based storage application, a request for transference of the first cryptographic token,
wherein the request for transference indicates a destination cryptographic address corresponding to a second cryptography-based storage application;
using a blockchain operation, verifying that the first cryptographic token is assigned to the first cryptography-based storage application; and
assigning the first cryptographic token to the second cryptography-based storage application at the destination cryptographic address.

16. The method of claim 9 further comprising:
determining to revoke the first cryptographic token;
using a cryptographic operation, assigning the first cryptographic token to a null address; and
removing the first entry from the metadata database.

17. A non-transitory computer-readable medium storing instructions that, when executed by one or more processors, cause the one or more processors to perform operations comprising:
generating a unique identifier for a physical item;
receiving a confirmation request from a first cryptography-based storage application of a first user,
wherein the confirmation request comprises a confirmation number;
comparing the confirmation number against the unique identifier to determine that the first user owns the physical item;
generating a first cryptographic token based on the unique identifier,
wherein the first cryptographic token is a non-fungible token,
wherein the first cryptographic token is associated with a first entry in a metadata database;
committing the first cryptographic token to a blockchain;
assigning the first cryptographic token to the first crytography-based storage application;
recieving a login request for accessing the physical item,
wherein the login request includes an address associated with the first cryptography-based storage applicatiion and a cryptographic signature generated using a private key of the first cryptography-based storage application;

determing, using the cryptographic signature, that the first cryptography-based storage application controls the first cryptographic token; and granting access to the physical item responsive to the login request.

18. The non-transitory computer-readable medium of claim 17, wherein the first cryptography-based storage application is stored on the physical item.

19. The non-transitory computer-readable medium of claim 17, wherein the first cryptographic token authenticates login requests for the metadata database.

20. The non-transitory computer-readable medium of claim 17, wherein the metadata database communicates with the physical item, the operations further comprising:
   at regular intervals of time, requesting a profile of data on the physical item, wherein the profile of data describes a plurality of resource allocations to the physical item; and
   storing the profile of data in the metadata database.

21. The non-transitory computer-readable medium of claim 17, wherein the metadata database stores data describing the physical item, the data comprising:
   a location of the physical item;
   usage by the physical item of network resources; and
   identifying information of the first user.

22. The non-transitory computer-readable medium of claim 17, the operations further comprising:
   receiving a request for a replacement of the physical item from the first cryptography-based storage application;
   using a blockchain operation, verifying that the first cryptographic token is assigned to the first cryptography-based storage application;
   obtaining a second unique identifier for a second physical item;
   generating a second cryptographic token based on the unique identifier,
     wherein the second cryptographic token is a non-fungible token, and
     wherein the second cryptographic token is associated with the first entry in the metadata database;
   committing the second cryptographic token to the blockchain; and
   assigning the second cryptographic token to the first cryptography-based storage application.

23. The non-transitory computer-readable medium of claim 17, the operations further comprising:
   receiving, from the first cryptography-based storage application, a request for transference of the first cryptographic token,
     wherein the request for transference indicates a destination cryptographic address corresponding to a second cryptography-based storage application;
   using a blockchain operation, verifying that the first cryptographic token is assigned to the first cryptography-based storage application; and
   assigning the first cryptographic token to the second cryptography-based storage application at the destination cryptographic address.

* * * * *